US012027142B2

(12) United States Patent
Peyrelevade et al.

(10) Patent No.: US 12,027,142 B2
(45) Date of Patent: Jul. 2, 2024

(54) HARMONICA

(71) Applicant: ALIEN BEATS RECORDS, Fréjus (FR)

(72) Inventors: Jerome Peyrelevade, Grasse (FR); Jean-Noel Kulichenski, Loches (FR)

(73) Assignee: ALIEN BEATS RECORDS, Fréjus (FR)

( * ) Notice: Subject to any disclaimer, the term of this patent is extended or adjusted under 35 U.S.C. 154(b) by 0 days.

(21) Appl. No.: 18/364,166

(22) Filed: Aug. 2, 2023

(65) Prior Publication Data

US 2023/0377539 A1 Nov. 23, 2023

Related U.S. Application Data

(62) Division of application No. 17/797,842, filed as application No. PCT/EP2021/052701 on Feb. 4, 2021, now Pat. No. 11,763,783.

(30) Foreign Application Priority Data

Feb. 5, 2020 (FR) ...................................... 2001144

(51) Int. Cl.
*G10D 7/14* (2020.01)
*G10D 9/035* (2020.01)

(52) U.S. Cl.
CPC ............... *G10D 7/14* (2020.02); *G10D 9/035* (2020.02)

(58) Field of Classification Search
CPC ................................ G10D 7/14; G10D 9/035
See application file for complete search history.

(56) References Cited

U.S. PATENT DOCUMENTS 2,473,210 A * 6/1949 Magnus .................. G10D 7/14 84/376 R
2,595,316 A * 5/1952 Wetzler .................... G10D 7/14 984/137
4,342,250 A * 8/1982 Robjent .................. G10D 7/14 984/137

(Continued)

FOREIGN PATENT DOCUMENTS

DE 242031 C 1/1911
WO 9323846 11/1993

OTHER PUBLICATIONS

International Search Report issued in corresponding International Application No. PCT/EP2021/052701, dated Apr. 29, 2021, pp. 1-2, European Patent Office, Rijswijk, Netherlands.

(Continued)

*Primary Examiner* — Robert W Horn
(74) *Attorney, Agent, or Firm* — HAUPTMAN HAM, LLP

(57) ABSTRACT

A harmonica including at least a comb including a plurality of chambers, a first plate including a plurality of blow reeds, a second plate including a plurality of draw reeds, the harmonica wherein each chamber of the plurality of chambers includes at least one material projection, each material projection being configured to reduce the oscillatory space of a draw reed, and in that it includes at least one additional plate arranged above the first plate and including a plurality of additional material projections, each additional material projection of the plurality of additional material projections being configured to reduce the oscillatory space of a blow reed.

19 Claims, 9 Drawing Sheets

(56) References Cited

U.S. PATENT DOCUMENTS

| | | | | |
|---|---|---|---|---|
| 5,182,413 | A * | 1/1993 | Epping | G10D 7/14<br>84/377 |
| 6,518,489 | B2 * | 2/2003 | Epping | G10D 7/14<br>84/378 |
| 6,635,814 | B2 * | 10/2003 | Antaki | G10D 7/14<br>84/377 |
| 11,763,783 | B2 * | 9/2023 | Peyrelevade | G10D 7/14<br>84/377 |
| 2023/0096049 | A1 * | 3/2023 | Peyrelevade | G10D 7/14<br>84/377 |

OTHER PUBLICATIONS

Written Opinion issued in corresponding International Application No. PCT/EP2021/052701, dated Apr. 29, 2021, pp. 1-7, European Patent Office, Rijswijk, Netherlands.

* cited by examiner

Section B-B

HARMONICA

The present application is a divisional application of U.S. application Ser. No. 17/797,842, filed Aug. 5, 2022, which is a U.S. National Phase of International Application Number PCT/EP2021/052701, filed Feb. 4, 2021, which claims priority to French Application No. 2001144, filed Feb. 5, 2020.

TECHNICAL FIELD

The present invention relates to the field of harmonicas, and more generally to free-reed wind instruments. It finds a particularly advantageous application in the field of diatonic harmonicas.

PRIOR ART

Conventionally, a diatonic harmonica 10, as represented in FIG. 1, comprises:

a. a comb 11 comprising a plurality of chambers 131;

b. two metal plates 110 and 120 with reeds 111 and 121, a plate 110 for the blow reeds 111 and a plate 120 for the draw reeds 121, the blow reeds 111 and the draw reeds 121 facing each other;

c. and two 160 covers to hold the harmonica 10.

It should be highlighted that when one blows into a harmonica, most of the air is evacuated through the blow reed 111, which by vibrating creates a sound, but little air also escapes through the draw reed 121. Similarly, when one inhales, most of the air passes through the draw reed 121, but little air also passes through the blow reed 111.

In some very specific cases, the user would prefer the opposite, i.e. to make only the draw reed 121 vibrate when blowing or to make only the blow reed 111 vibrate when inhaling. This situation is possible when the user is an experienced user, i.e. he has a good command of the instrument and when he positions his tongue very particularly when blowing or inhaling. This technique is difficult to master, and depends on several endogenous factors such as breath control, tongue muscle, etc., and several exogenous factors, related for example to the instrument itself.

One should remember that the chambers 131 of a harmonica 10 are not airtight spaces, so air passes through all possible places when the user blows or inhales. This poses several problems, mainly in some instrumental techniques that require, for example, different positions of the user's tongue for better control of the pressure of the air flow. These different techniques allow obtaining notes that are not native to the instrument, and that being so primarily by tuning the air flow inside and on the periphery of the chambers.

The other objects, features and advantages of the present invention will become apparent from a review of the following description and the appended drawings. It should be understood that other benefits may be incorporated.

SUMMARY

The present invention relates to a harmonica, preferably diatonic, comprising at least:

a. A comb comprising a plurality of chambers each comprising an opening configured to let a user's breath pass, each chamber defining an oscillatory space for a blow reed and an oscillatory space for a draw reed, the blow reed and the draw reed of each chamber defining a pair of complementary reeds;

b. A first plate comprising a plurality of blow reeds, the first plate being arranged opposite a first face, preferably an upper face, of the comb, each blow reed of the plurality of blow reeds being configured to oscillate in its oscillatory space when the user blows at least into the chamber defining said oscillatory space;

c. A second plate comprising a plurality of draw reeds, the second plate being arranged opposite a second face, preferably a lower face, of the comb, each draw reed of the plurality of draw reeds being configured to oscillate in its oscillatory space when the user inhales at least from the chamber defining said oscillatory space;

The harmonica being characterised in that:

d. At least part of the chambers of the plurality of chambers comprises at least one material projection, each material projection being at least partially arranged opposite a portion of a draw reed and being configured, preferably to reduce the oscillatory space of said draw reed and, in some cases to enable the oscillation of the blow reed, in other cases the quicker redirection of air towards the end of the draw reed to make it more responsive (set it in oscillatory motion more quickly) and, to enable the oscillation of the blow reed of the complementary pair of said draw reed when the user inhales from the chamber of said draw reed, preferably by positioning his tongue so as to make the blow reed oscillate, advantageously when the position of the user's tongue minimises the space available for air to pass between it and the palate, whether by moving the back of the tongue back towards the throat, or by advancing the middle portion of the tongue towards the teeth; and/or e. And in that it comprises at least one additional plate arranged opposite a face of the first plate, preferably opposite a face of the first plate opposite to the face of the first plate opposite the first face of the comb, and comprising at least one plurality of additional material projections, each additional material projection being at least partially arranged opposite a portion of a blow reed and being configured, preferably to reduce the oscillatory space of said blow reed and, in some cases to enable the oscillation of the draw reed, in other cases the quicker redirection of the air towards the end of the blow reed to make it more responsive (set it in oscillatory motion more quickly) and, to enable the oscillation of the draw reed of the complementary pair of said blow reed when the user blows into the chamber of said blow reed, preferably by positioning his tongue so as to make the draw reed oscillate, advantageously when the position of the user's tongue minimises the space available for air to pass between it and the palate, whether by moving the back of the tongue back towards the throat, or by advancing the middle portion of the tongue towards the teeth.

The present invention allows for a better control of the air flow inside each chamber. In particular, the comb, according to the present invention, allows reaching notes that are not natively present on the instrument with the draw reeds and that being so in a much simpler way for the user, by directing the air towards where it must leave the chamber more directly.

In addition, the comb, according to the present invention, also allows reaching non-native notes with blow reeds or draw reeds, which could then depend on the position of the user's tongue.

In particular, the comb helps direct the air well. The fact that it comprises material projections allows compacting the air flow even more to force it to pass only where it is most effective.

In particular, the additional plate allows reaching notes that are not natively present on the instrument with the blow reeds and that being so in a much simpler way for the user, by directing the air towards where it must leave the chamber more directly.

In addition, the additional plate also allows reaching non-native notes with draw or blow reeds, which could then depend on the position of the user's tongue.

In particular, the additional plate helps direct the air well. The fact that it comprises additional material projections and lugs allows compact the air flow even more to force it to pass only where it is most effective.

The present invention also allows better managing the tightness of a harmonica, in particular of the chambers of a harmonica.

The present invention also allows better managing the air flow inside the chambers, to considerably improve the ease of play of the instrument.

The present invention allows for an improvement of the tightness of the chambers of a harmonica, in part thanks to a cleverly designed comb to solve an endemic problem of diatonic harmonicas: structurally eliminating air leaks between the comb and the plates.

The present invention also allows improving the responsiveness of the reeds, in particular for playing notes that are the most difficult to trigger.

The present invention makes it easier to obtain all of the notes on the instrument, including notes that are generally difficult to access.

The present invention allows homogenising the obtainment of all the notes. In particular, the present invention allows making the draw reeds vibrate when the user blows, mainly at the low and medium notes. Similarly, the present invention allows making the blow reeds vibrate when the user inhales, mainly at the high notes.

The present invention allows triggering easily the 36 existing notes over 3 octaves, and even a few additional notes above the highest note.

The present invention allows for a great responsiveness of the harmonica regardless of the note to be played.

The present invention confers a very fluid ease of play on the harmonica allowing reaching and chaining the 36 notes to create phrasings in all keys.

The present invention allows playing easily in the 12 keys on a diatonic harmonica, which is yet supposed to play only in a single key.

The present invention allows playing easily all pieces with a single diatonic harmonica, where usually a harmonica player uses one harmonica per piece key.

The present invention allows reducing, and possibly suppressing, the spin effect, primarily thanks to the use of lugs.

The present invention allows achieving a laminar pressure in the chamber so as to trigger the opposite reed. Surprisingly, the present invention allows reaching a laminar speed much more quickly, and maintains it more surely.

Advantageously, each material projection of the comb is intended to trigger a draw reed when the user blows so as to trigger a draw reed, avoiding leaks at the base of the draw reed and along a portion of the draw reed, thus allowing compacting air and thus helping trigger the draw reed.

Advantageously, each material projection of the comb is intended to trigger a blow reed when the user inhales so as to trigger a blow reed, avoiding leaks at the base of the draw reed and along a portion of the draw reed, thus allowing compacting air and thus helping redirect the air towards the blow reed.

Advantageously, each additional material projection of the additional plate is intended to trigger a blow reed when the user inhales so as to trigger a blow reed, avoiding leaks at the base of the blow reed and along a portion of the blow reed, thus allowing compacting air and thus helping release the blow reed.

Advantageously, each additional material projection of the additional plate is intended to trigger a draw reed when the user blows so as to trigger a draw reed, avoiding leaks at the base of the blow reed and along a portion of the blow reed, thus allowing compacting air and thus helping redirect the air towards the draw reed.

Preferably, the harmonica according to the present invention may comprise only one amongst the comb and the additional plate. Indeed, the comb alone allows solving at least part of the problems indicated before, and the same applies to the additional plate. Thus, the harmonica according to the present invention may comprise one amongst the additional plate and the comb, or else comprise the comb and the additional plate.

Advantageously, the comb and the additional plate work in synergy with each other so as to solve even more effectively at least part of the problems indicated before. Indeed, surprisingly, the comb and the additional plate are complementary in terms of air flow confinement in the chamber.

The present invention also relates to a comb for a harmonica, preferably diatonic, comprising a first plate comprising a plurality of blow reeds and a second plate comprising a plurality of draw reeds, said comb comprising a plurality of chambers, each chamber of the plurality of chambers being associated with a complementary pair of reeds comprising a blow reed and a draw reed, each chamber of the plurality of chambers each comprising an opening configured to allow the user's breath to pass and each intended to define an oscillatory space for a blow reed and for a draw reed, said comb being characterised in that each chamber of the plurality of chambers comprises at least one material projection, each material projection being intended to be arranged at least partially opposite a portion of a draw reed and, preferably to reduce the oscillatory space of said draw reed and, to allow the blow reed to oscillate with the complementary pair of said draw reed when the user inhales from the chamber of said draw reed, preferably by positioning his tongue so as to make the blow reed oscillate, advantageously when the position of the user's tongue minimises the space available for air to pass between it and the palate, whether by pulling back the back of the tongue towards the throat, or advancing the middle portion of the tongue towards the teeth.

The present invention allows for an improve of the tightness of the chambers of a harmonica, partly thanks to a cleverly designed comb to solve an endemic problem of diatonic harmonicas: structurally eliminating air leaks between the comb and the plates.

An additional plate for a harmonica, preferably diatonic, comprising a first plate comprising a plurality of blow reeds and a second plate comprising a plurality of draw reeds, each blow reed forming a complementary pair of reeds with a draw reed, said additional plate being intended to be arranged above the first plate, and being characterised in that it comprises at least one plurality of additional material projections, each additional material projection being at least partially arranged opposite a portion of a blow reed and being intended, preferably to reduce the oscillatory space of said blow reed and, in some cases, to enable the oscillation of the draw reed, in other cases the quicker redirection of air towards the end of the blow reed to make it more responsive (put it in oscillatory motion more quickly) and, to enable the oscillation of the draw reed of the complementary pair of said blow reed when the user blows into the chamber of said blow reed, preferably by positioning his tongue so as to make the draw reed oscillate, advantageously when the position of the user's tongue minimises the space available for air to pass between it and the palate, either by moving the back of the tongue towards the throat, or by advancing the middle portion of the tongue towards the teeth.

The present invention allows for an improve of the tightness of the chambers of a harmonica, partly thanks to an additional plate cleverly designed to solve an endemic problem of diatonic harmonicas: structurally eliminating air leaks between the comb and the plates.

A kit for a harmonica, preferably diatonic, comprising at least one comb according to the present invention and at least one additional plate according to the present invention.

BRIEF DESCRIPTION OF THE FIGURES

The aims, objects, as well as the features and advantages of the invention will appear better from the detailed description of an embodiment of the latter which is illustrated by the following appended drawings wherein.

Figure 1:
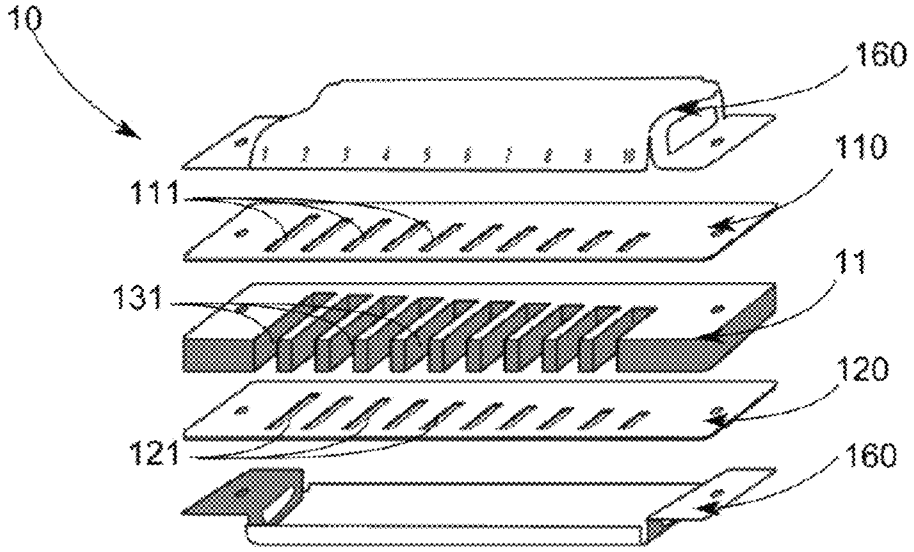
FIG. 1 illustrates an exploded view of a harmonica according to the prior art.

The drawings are given as examples and do not limit the invention. They consist of schematic representations of principle intended to facilitate understanding of the invention and are not necessarily scaled to practical applications. In particular the dimensions are not representative of reality.

DETAILED DESCRIPTION

Before starting a detailed review of embodiments of the invention, optional features are set out hereinafter which could possibly be used in combination or alternatively.

According to one example, each chamber of the plurality of chambers has a bottom opposite the opening and configured to stop the breath of the user, two lateral walls configured to separate one chamber from the other contiguous chambers, the upper portion of the chamber being defined in part at least by at least part of a blow reed and the lower portion of the chamber being defined in part at least by at least part of the draw reed complementary to said blow reed.

This allows channeling the air flow into a chamber.

According to one example, at least part of the chambers of the plurality of chambers has a rounded bottom, preferably concave.

This allows improving the responsiveness of the blow reeds in the treble, and thus helps trigger notes that do not natively exist in the treble, while preserving the responsiveness of the native notes.

According to one example, at least part of the chambers of the plurality of chambers has a widthwise extension dimension larger than the widthwise extension dimension of another part at least of the chambers of the plurality of chambers.

A larger width makes it easier to trigger blow reeds by inhaling. Because of the distribution of notes, it is more useful for high notes, hence the fact that these large chambers are those corresponding to chambers 7 to 10.

According to one example, at least part of the chambers of the plurality of chambers has a widthwise extension dimension smaller than the widthwise extension dimension of at least another part of the chambers of the plurality of chambers.

A narrower width allows triggering the draw reeds when blowing. Because of the distribution of notes, it is more useful for low notes, hence the fact that these narrow chambers are those corresponding to chambers 1 to 6.

According to one example, at least part of the chambers of the plurality of chambers comprises lateral walls having a widthwise extension dimension larger than the widthwise extension dimension of the lateral walls of another part at least of the chambers of the plurality of chambers.

This allows having chambers that are narrower in width than other chambers.

According to one example, at least one lateral wall of a part of the chambers of the plurality of chambers comprises an additional surface, preferably this additional surface comprising a bevel.

This allows thickening the lateral wall.

This allows forming a guide for the air flow entering and exiting the chamber through its opening.

This keeps the opening width of the conventional chamber while the width of the chamber is smaller.

This allows the user not to be disturbed by a change in the width of the opening while the width of the chamber has been modified.

This keeps the surface in contact with the user's mouth equal to the situation of a prior art harmonica so that the player is not disoriented when moving from one chamber to another.

This therefore allows adding material to the lateral walls of the chamber so that it is narrower.

A bevelled shape allows adding material just after the opening of the chamber, and extends from the base of the blow reed towards the bottom of the chamber.

This also allows maintaining a constant air flow throughout the instrument, i.e. between all chambers, as the width of each opening is constant.

According to one example, at least part of the chambers of the plurality of chambers comprises lateral walls having a widthwise extension dimension smaller than the widthwise extension dimension of the lateral walls of another part at least of the chambers of the plurality of chambers.

This allows having chambers whose width is larger than that of other chambers.

According to one example, at least one lateral wall of a portion of the plurality of chambers comprises an indentation located between the chamber bottom and the chamber opening.

This allows reducing the thickness of the lateral wall.

This allows forming a cavity for the air flow in and out of the chamber through its opening.

This allows maintaining a conventional chamber opening width while the width of the chamber is larger.

This allows the user not to be disturbed by a change in the width of the opening while the width of the chamber has been modified.

This allows keeping the surface in contact with the mouth of the user equal to the situation of a prior art harmonica so that the player is not disoriented when moving from one chamber to another.

Hence, this allows removing material from the lateral walls of the chamber so that it is wider.

This also allows maintaining a constant air flow throughout the instrument, i.e. between all chambers, as the width of each opening is constant.

According to one example, each material projection extends from the bottom of its chamber towards the opening of its chamber.

According to one example, each material projection comprises an extension dimension in thickness, this extension dimension in thickness decreasing from the bottom of its chamber towards the opening of its chamber, preferably defining a ramp.

This allows facilitating the triggering of the draw reed when the user blows for this purpose.

This allows that when the blow reed becomes blocked, the air, which until then went to the bottom of the chamber to exit through the end of the blow reed, turns around to exit through the draw reed.

This allows the air flow to make a U-turn, directing the air flow from the end of the blow reed to that of the draw reed.

This allows redirecting the already compacted air more quickly towards the end of the draw reed when the user blows in order to trigger it.

According to one example, at least part of the material projections defines a plateau with the bottom of their chamber, this plateau extending along a plane orthogonal to the plane of extension of the lateral walls of their chamber.

According to one example, the lower portion of each chamber of the plurality of chambers comprises an air passage for a draw reed, and each material projection extends at least in part so as to obstruct at least partially the air passage of a draw reed.

According to one example, each material projection has a lengthwise extension dimension and the air passage of a draw reed has a lengthwise extension dimension, the ratio between the lengthwise extension dimension of each material projection and the lengthwise extension dimension of the air passage of a draw reed is comprised between 0.1 and 0.9, preferably between 0.2 and 0.5 and advantageously equal to 0.33.

According to one example, the upper portion of each chamber of the plurality of chambers comprises an air passage for a blow reed, and each additional material projection extends at least partially so as to obstruct at least partially the passage the air of a blow reed.

According to one example, each additional material projection has a lengthwise extension dimension and the passage of the air of a blow reed has a lengthwise extension dimension, the ratio between the lengthwise extension dimension of each additional material projection and the lengthwise extension dimension of the air passage of a blow reed is comprised between 0.1 and 0.9, preferably between 0.3 and 0.7 and advantageously equal to 0.5.

According to one example, each additional material projection has a widthwise extension dimension and a lengthwise extension dimension, and each blow reed of the plurality of blow reeds comprises a widthwise extension dimension and a lengthwise extension dimension, and each additional material projection is associated with a blow reed of the plurality of blow reeds, and the ratio between the lengthwise extension dimension of an additional material projection and the lengthwise extension dimension of its blow reed is comprised between 0.1 and 0.9, preferably between 0.3 and 0.7 and advantageously equal to 0.5.

According to one example, each chamber of the plurality of chambers comprises a widthwise extension dimension and a lengthwise extension dimension, and each additional material projection has a widthwise extension dimension equal to the widthwise extension dimension of their chamber, and a lengthwise extension dimension smaller than the lengthwise extension dimension of their chamber.

According to one example, the ratio between the lengthwise extension dimension of an additional material projection and the lengthwise extension dimension of its chamber is comprised between 0.1 and 0.9, preferably between 0.3 and 0.7 and advantageously equal to 0.5.

According to one example, each additional material projection has an internal face facing the inside of its chamber and an external face facing the outside of its chamber, and each additional material projection comprises at least one lug arranged on its internal face.

According to one example, each lug extends from the inlet of each chamber towards the bottom of each chamber according to a lengthwise extension dimension.

According to one example, the lug extends at least partially into the air passage of a blow reed.

According to one example, each blow reed of the plurality of blow reeds comprises a widthwise extension dimension and a lengthwise extension dimension, and each lug is associated with a blow reed of the plurality of blow reeds, and the ratio between the lengthwise extension dimension of a lug and the lengthwise extension dimension of its blow reed is comprised between 0.01 and 0.9, preferably between 0.1 and 0.7 and advantageously equal to 0.2.

According to one example, each material projection has a widthwise extension dimension and a lengthwise extension dimension, and each draw reed of the plurality of draw reeds comprises a widthwise extension dimension and a lengthwise extension dimension, and each material projection is associated with a draw reed of the plurality of draw reeds, and the ratio between the lengthwise extension dimension of a material projection and the lengthwise extension dimension of its reed suction is comprised between 0.1 and 0.9, preferably between 0.2 and 0.5 and advantageously equal to 0.33.

According to one example, each chamber of the plurality of chambers comprises a widthwise extension dimension and a lengthwise extension dimension, and each material projection has a widthwise extension dimension equal to the widthwise extension dimension of their chamber, and a lengthwise extension dimension less than the lengthwise extension dimension of their chamber.

According to one example, the ratio between the lengthwise extension dimension of a material projection and the lengthwise extension dimension of its chamber is comprised between 0.1 and 0.9, preferably between 0.2 and 0.5 and advantageously equal to 0.33.

According to one example, each material projection has an internal face facing the inside of its chamber and an external face facing the outside of its chamber, and the material projection comprises at least one protuberance arranged on its external face.

This allows improving the tightness of the chamber.

This allows reducing, and possibly suppressing, the spin effect, mainly through the use of protuberances.

This allows improving the containment of the air flow in the chamber.

According to one example, the protuberance has a lengthwise extension dimension proportional to the lengthwise extension dimension of the material projection comprising said protuberance in question.

According to one example, the ratio between the lengthwise extension dimension of a protuberance and the lengthwise extension dimension of its chamber is comprised between 0.01 and 0.9, preferably between 0.1 and 0.5 and advantageously equal to 0.19.

According to one example, the protuberance extends at least partially into the air passage of a draw reed.

According to one example, each protuberance extends from the bottom of each chamber towards the inlet of each chamber according to the lengthwise extension dimension.

According to one example, the comb has a greater flexibility than the flexibility of the first plate and the flexibility of the second plate.

This allows improving the tightness of the chambers and therefore the confinement of air flows. This allows the comb to deform locally to locally act as a seal. Advantageously, the comb is more flexible than the first plate and/or than the second plate. Thus, this allows the comb to improve tightness between the comb and the first plate and/or the second plate.

Indeed, an endemic problem of diatonic harmonicas of the prior art is the lack of tightness, and in particular the air that infiltrates between the comb and the plates. However, any loss of air makes it difficult to trigger the opposite reed. In general, the prior art seeks to improve this tightness by working on the manufacturing process to make the plates and the comb as flat as possible, for example by sandblasting them manually, and by using increasingly dense materials.

Thus, the present invention preferably uses a more flexible comb than the first and second plates instead of having a very flat and very dense comb.

Surprisingly, by deciding to direct the development of this invention in a direction contrary to the teaching of the prior art, tightness is improved. Indeed, the invention preferably uses a flexible comb and having crevices so that it is compresses and the material spreads along the plate(s) and thus plugs the micropockets of air.

Cleverly, this improved tightness achieved by a comb that is more deformable than the first and second plates works in synergy with the material projections to further improve the tightness of the chambers.

Advantageously, the comb has a greater flexibility index on its upper portion and on its lower portion than in its central part according to its thickness dimension.

The present invention, via the preferred use of this so-called flexible comb, allows having plates that are not perfectly flat, having a comb that is not perfectly flat, creating adhesion at the joint between the plates and the comb by a slight comb compression. Indeed, it is enough to tighten the screws very slightly, and the material forming the comb deforms, compresses, and extends along the plates, which will further strengthen tightness.

Having less flexibility at its centre, i.e. the core of the comb, enables the comb not to deform completely, and to preserve the integrity of the chamber.

In the prior art with a rigid comb, the screws are tightened as much as possible to prevent air from passing between the comb and each of the plates as much as possible. Over time, the plates deform at the screws, which will paradoxically create new air pockets, and the instrument will gradually lose its tightness. The present invention cleverly and preferably uses a flexible comb, i.e. flexible, so the tightening of the screws can be done to a minimum. It is enough to position them just enough to ensure the maintenance of the elements between them. The softness of the edges of the comb takes care of sealing the chambers, as described before.

According to one example, each material projection comprises an end remote from the opening and from the bottom of its chamber.

According to one example, the end of each material projection is arranged in its chamber so as to enable the passage of an air flow via the draw reed corresponding to its chamber.

The present invention relates to a modified comb for harmonica, as well as an additional plate for harmonica, and finally a harmonica integrating these two innovative elements. Each of these two elements is innovative and each of these innovations is based on the same inventive principle: better control of the air flow in the chamber, and preferably on the periphery of the chamber, of a harmonica, enabling the user to obtain more easily and to better control some musical notes that would otherwise be difficult to reach.

Advantageously, this innovative comb as well as this innovative additional plate could also work together, which further improves the responsiveness of the instrument, the effects of each innovative element being enhanced by those of the other innovative element.

Thus, according to one embodiment, the harmonica is preferably a diatonic harmonica. The harmonica 100, according to a preferred embodiment and illustrated in FIG. 1, comprises at least:

a. A cleverly designed comb 130;
b. A first plate 110 comprising a plurality of blow reeds 111;
c. A second plate 120 comprising a plurality of draw reeds 121;
d. A cleverly designed additional plate 150;

e. Preferably, covers 160 arranged on either side of the aforementioned elements.

Figure 2:
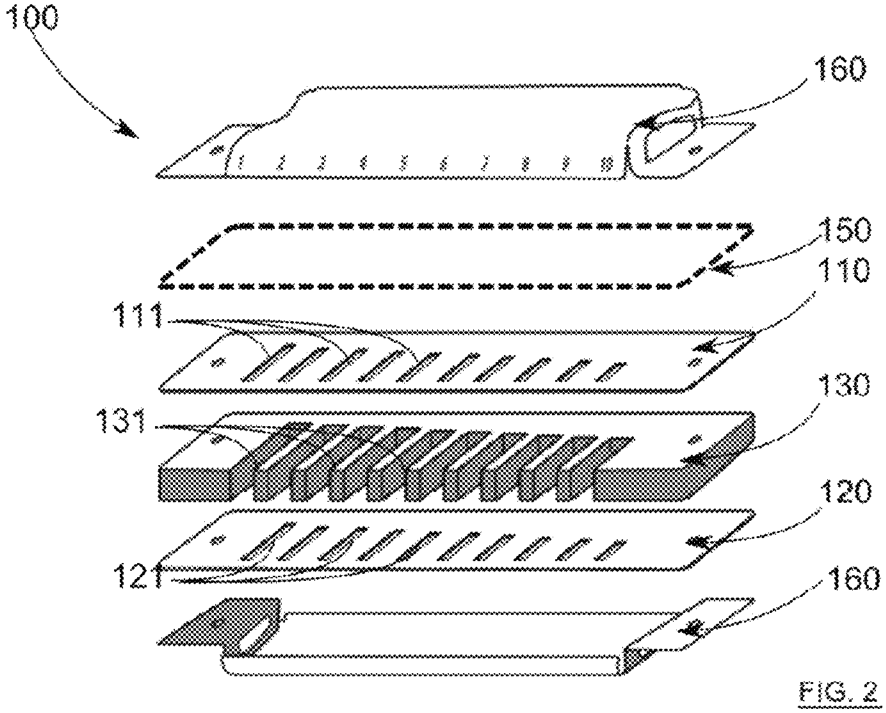
FIG. 2 illustrates an exploded view of a harmonica according to one embodiment of the present invention.

In FIG. 2, only the location of the additional plate 150 has been mentioned for clarity. This additional plate 150 is represented according to one embodiment in FIG. 10 and will be described in detail later on.

Advantageously, the first plate 110 is arranged above the comb 130. The second plate 120 is arranged below the comb 130. And the additional plate 150 is arranged above the first plate 110. In this configuration, the covers 160 are arranged one under the second plate 120, the other above the additional plate 150.

As illustrated throughout FIGS. 11 to 14, the first plate 110 therefore comprises the plurality of blow reeds 111. Hence, this first plate 110 is arranged above the comb 130. Thus, each blow reed 111 is configured to oscillate in its own oscillatory space 112 when the user blows into the chamber 131 defining said own oscillatory space 112. The blow reeds 111 extend from the opening 135 of the chamber 131 towards the bottom 136 of the chamber 131. Thus, the end of the blow reed 111 secured to the first plate 110 lies at the opening 135 of the chamber 131, preferably above the opening 135 of the chamber 131, and the oscillating end of the blow reed 111 lies towards the bottom 136 of the chamber 131. When the blow reed 111 oscillates, its free end moves back and forth. Conventionally, the lengthwise extension dimension of each blow reed 111 is preferably proportional to the lengthwise extension dimension 132 of the corresponding chamber 131.

Similarly, the second plate 120 comprises a plurality of draw reeds 121. The second plate 120 is arranged below the comb 130. Each draw reed 121 of the plurality of draw reeds 121 is configured to oscillate in its own oscillatory space 122 when the user inhales from the chamber 131 defining said own oscillatory space 122. The draw reeds 121 extend from the bottom 136 of the chamber 131 in the direction of the opening 135 of the considered chamber 131. Thus, the end of the draw reed 121 secured to the second plate 120 lies at the bottom 136 of the chamber 131, preferably below the bottom 136 of the chamber 131, and the oscillating end of the reed suction 121 lies towards the opening 135 of the chamber 131. When the draw reed 121 oscillates, its free end moves back and forth. Conventionally, the lengthwise extension dimension of each draw reed 121 is preferably proportional to the lengthwise extension dimension 132 of the corresponding chamber 131.

Hence, it should be noted that the draw reeds 121 are mounted head-to-tail with respect to the blow reeds 111, and that the draw reeds 121 and the blow reeds 111 are mounted on either side of the comb 130, preferably of the plurality of chambers 131.

Figure 3:
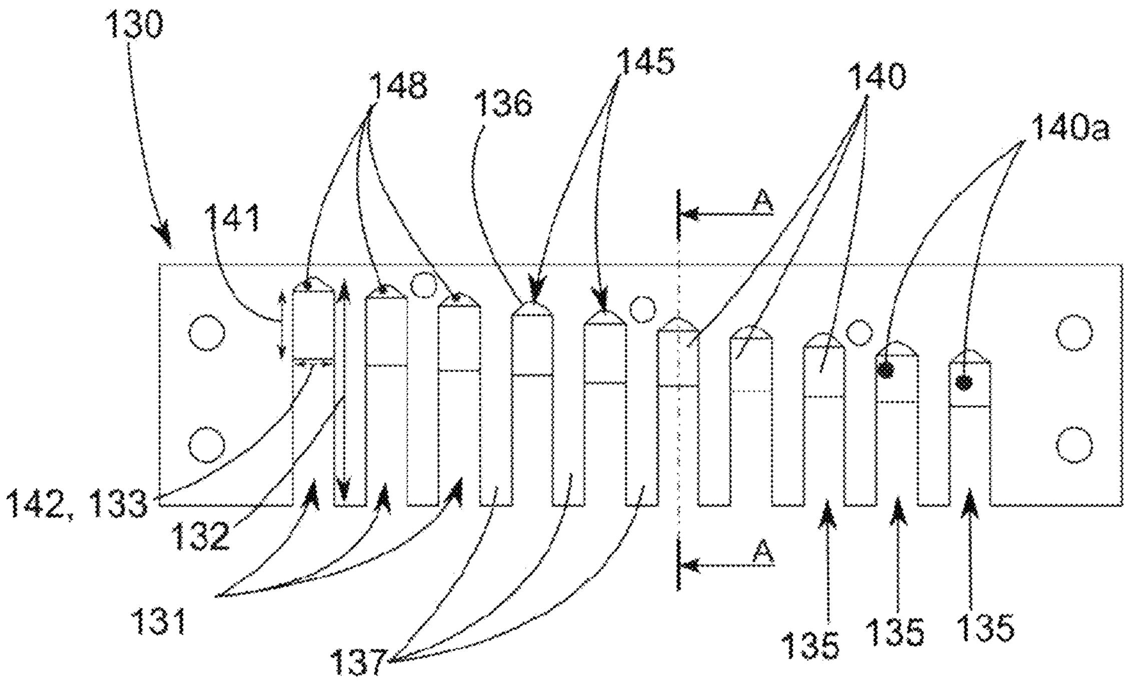
FIG. 3 illustrates a top view of a comb according to an embodiment of the present invention.

According to a preferred embodiment and as illustrated in FIG. 3, the comb 130 comprises a plurality of chambers 131. Each chamber 131 comprises an opening 135 configured to enable an incoming or outgoing air flow 170 to pass depending on whether the user blows or inhales. Each chamber 131 defines an oscillatory space, respectively 112 and 122, for a blow reed 111 and a draw reed 121, respectively. Advantageously, the blow reed 111 and the draw reed 121 of each chamber 131 define a pair of complementary reeds.

Figure 4:
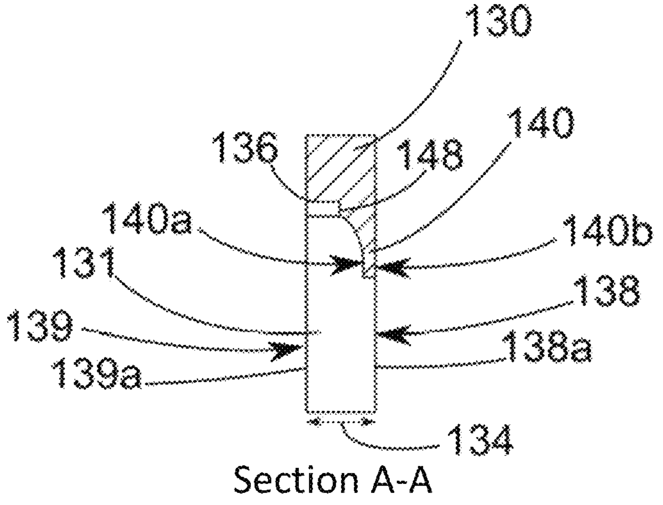
FIG. 4 illustrates a side sectional view of the comb of FIG. 3.
Figure 5:
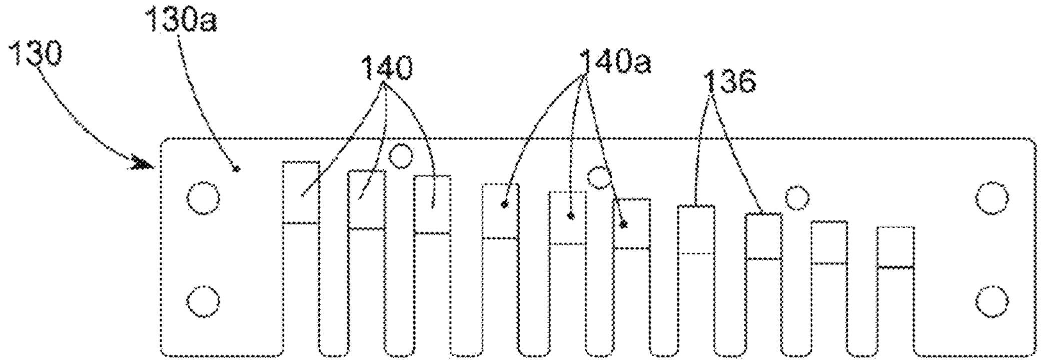
FIG. 5 illustrates a top view of a comb according to another embodiment of the present invention.

According to an advantageous and preferred embodiment, and as illustrated in FIGS. 3,4 and 5 for example, at least one chamber 131 of the plurality of chambers 131 comprises at least one material projection 140. Advantageously, each chamber 131 of the plurality of chambers 131 comprises a material projection 140.

This material projection 140 is configured to reduce the oscillatory space 122 of the draw reed 121. Preferably, this material projection 140 is configured to enable the oscillation of a blow reed 111 when the user draws air from said chamber 131, preferably by positioning his tongue at a particular angle with respect to the direction air flow 170. Preferably, this material projection 140 is configured to reduce the oscillatory space 122 of the draw reed 121 and to enable the oscillation of a blow reed 111, a reed complementary to said draw reed 121, when the user inhales from the chamber of said draw reed 121.

The present invention is preferably designed so that this phenomenon occurs when the user positions his tongue so as to make the blow reed 111 oscillate, i.e. when the position of the user's tongue minimises the space available for air to pass between it and its palate, whether by moving the back of the tongue towards the throat, or by advancing the middle portion of the tongue towards the teeth. In this particular configuration, and as described later on, the draw reed 121 will not vibrate as much as the blow reed 111 while the user is yet in the process of inhaling air throughout the chamber 131. Indeed, surprisingly, the draw reed 121 will be blocked in its vibration throughout a set of pressures established in the considered chamber 131. It should be noted that, preferably, the draw reed 121 does not come into contact with the material projection 140, and that a pressure effect allows blocking the vibration of the latter.

Cleverly, the present invention advantageously takes advantage of a set of pressures established in the chamber 131 and allowing blocking the vibration of a reed while enabling the vibration of the complementary reed.

According to one embodiment, this set of pressures is based on the formation of an under-pressure in the chamber 131 at the draw reed 121 when the user inhales in a configuration intended to make the blow reed 111 vibrate. In this configuration, the inhale creates an under-pressure in the chamber 131, therefore creating an overpressure outside the chamber 131 at the lower level 138 and at the upper level 139 of the chamber 131. In particular, the overpressure at the draw reed 121 blocks it, whereas the overpressure at the blow reed 111 will make it vibrate. Indeed, the circuit of the air 170 in the chamber 131 in this configuration encounters less resistance passing via the blow reed 111 than via the draw reed 121. Henceforth, inhaling allows making the blow reed 111 vibrate.

Figure 12:
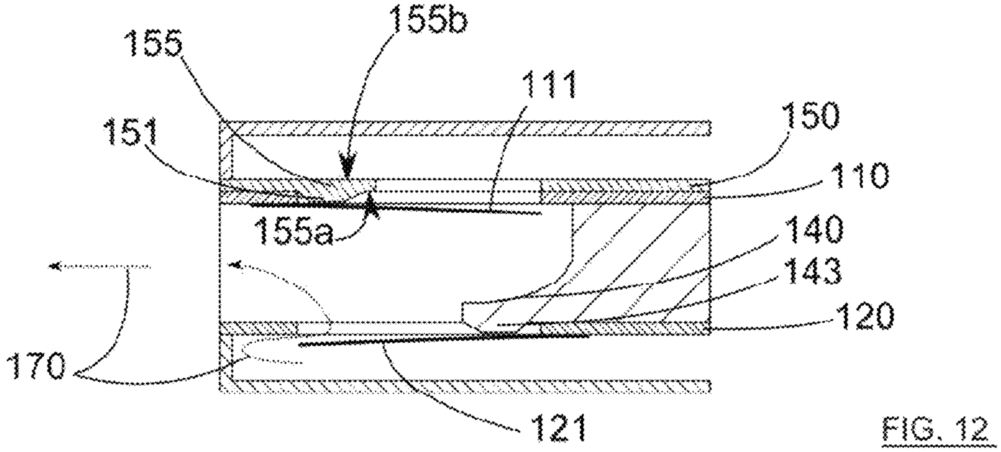
FIG. 12 illustrates a schematic sectional side view of a harmonica according to an embodiment of the present invention when the user inhales and wishes to make the draw reed vibrate.
Figure 14:
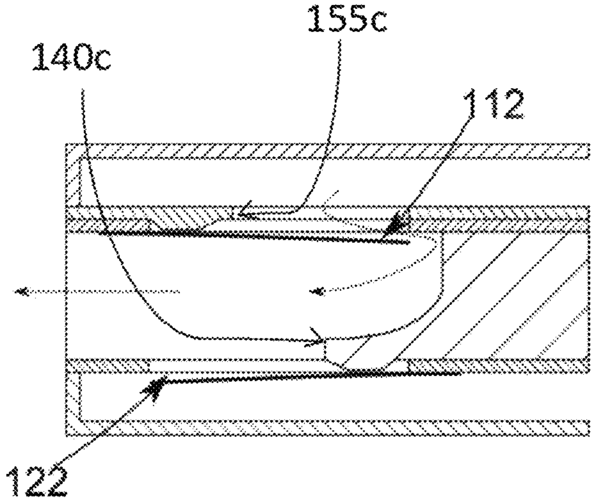
FIG. 14 illustrates a schematic sectional side view of a harmonica according to an embodiment of the present invention when the user inhales and wishes to make the blow reed vibrate.

This situation is for example illustrated in FIG. 14. In FIG. 14, the air flow circulates via the blow reed 111 while the user inhales from the chamber 131, thereby enabling the vibration of the blow reed 111 while blocking the draw reed 121 by said set of pressures. Conversely, the case of a normal inhale is illustrated in FIG. 12, the user inhales air from the chamber 131 and thus makes the draw reed 121 vibrate, when he does not place his tongue in a particular way.

Advantageously, the set of pressures established in the chamber 131 allows the drawn air to have no choice but to circulate via the blow reed 121, therefore making the latter vibrate. In this configuration, the user can reach a note that is not provided for by the instrument by inhaling from a chamber 131 and therefore making the blow reed 111 vibrate, and that being so much more easily than on a "classic" harmonica, thanks to the present invention.

In a particularly advantageous manner, each material projection 140 allows making a blow reed 121 vibrate when the user inhales in a chamber 131, while reducing, and possibly avoiding, air leaks in the lower portion of the chamber; Indeed, the material projection 140 allows compacting air in the chamber 131 and thus blocking the vibration of the draw reed 121 while enabling the vibration of the blow reed 111.

Cleverly, each material projection 140 allows making a blow reed vibrate when the user inhales in a chamber 131 through an advantageous geometry of the material projection.

According to one embodiment, and as illustrated in FIG. 4, the material projection 140 comprises a variable thickness according to its lengthwise extension dimension 141; This thickness thus defines a ramp; this ramp enables air 170 to be redirected more quickly to the end of the draw reed 121 than in the absence of a ramp. Hence, this allows facilitating the oscillation of the draw reed 121 while the user blows into the chamber 131.

Figure 15:
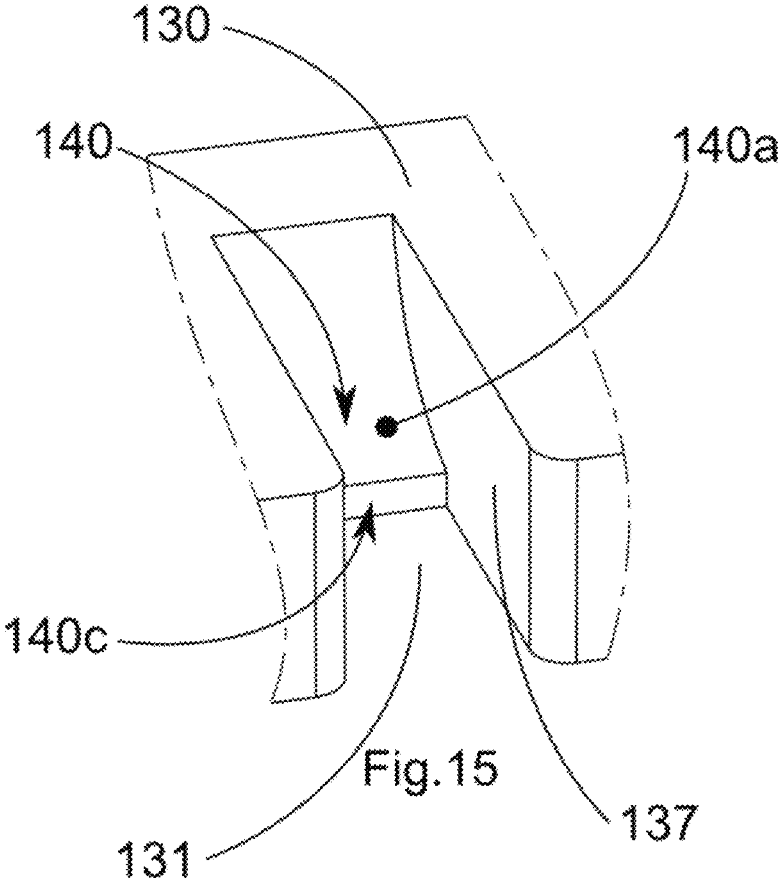
FIGS. 15 to 17 illustrate schematic perspective views of various embodiments of chambers of a harmonica according to embodiments of the present invention.
Figure 16:
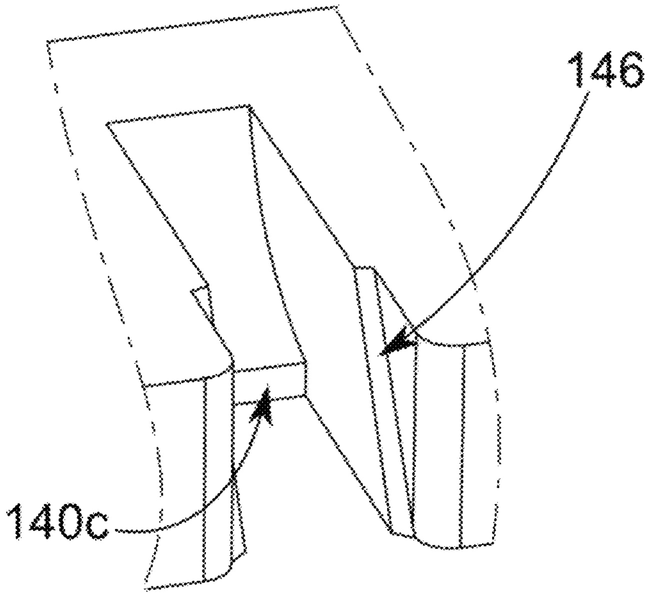

According to one embodiment, this ramp may have various shapes, such as a straight shape, a concave shape or possibly a convex shape. Preferably, and as illustrated in FIGS. 15 and 16, the ramp has a convex shape.

According to one embodiment, the material projection 140 forms a right angle with respect to the bottom 136 of the chamber 131. Preferably, the upper surface of the material projection 140 extends in a plane orthogonal to the plane of extension of the lateral walls 137 of the chamber 131. According to an embodiment illustrated in FIG. 17, at least one portion of the upper surface of the material projection 140 extends in a plane orthogonal to the plane of extension of the lateral walls 137 of the chamber 131 and then defines a plateau 148.

According to one embodiment, each material projection 140 allows reducing the space for the passage of air 170 at the base of the draw reed 121 when the user inhales so as to trigger, i.e. make vibrate, a blow reed 111; This makes it easier to block the draw reed 121 and the vibration of the blow reed 111.

Preferably, and as illustrated in FIGS. 3 to 9, each chamber 131 comprises a bottom 136 opposite to the opening 135. This bottom 136 is configured to stop the blow of the user and define one of the limits of the chamber 131. Each chamber 131 also comprises two lateral walls 137 configured to separate one chamber 131 from the other contiguous chambers 131. The upper portion 139 of each chamber 131 is defined by a blow reed 111 and the lower portion 138 of each chamber 131 is defined at least partially by a material projection 140 and by at least one portion of the draw reed 121 complementary to said blow reed 111.

Figure 9:
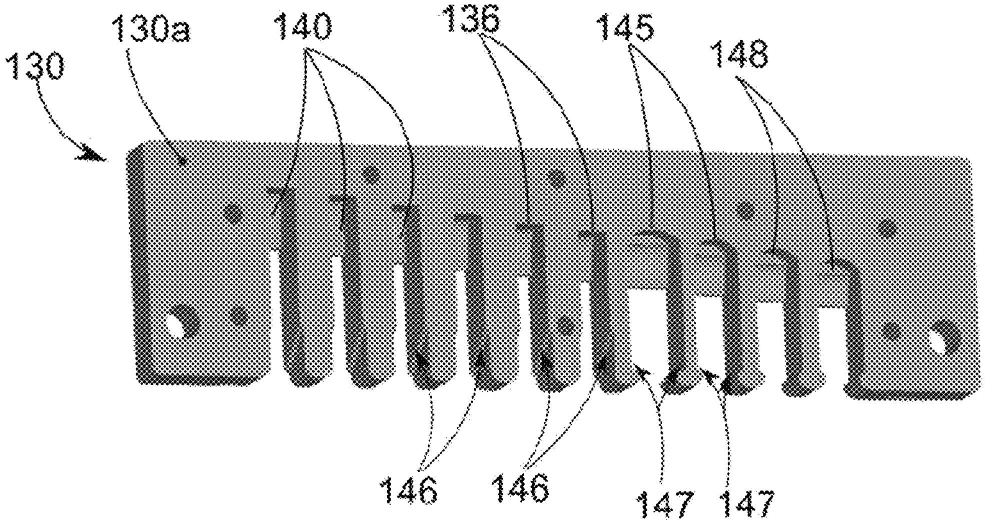
FIG. 9 illustrates a perspective view of the comb according to another embodiment of the present invention.

Cleverly, and according to one embodiment, the bottom of some chambers 131 has a rounded bottom 136. This rounded bottom 136 is concave. FIGS. 3 and 9 illustrate such bottoms 136.

According to one embodiment, the chambers 131 related to high notes, advantageously the chambers related to holes numbers 7 to 10 of the harmonica 100, have a concave bottom 136 as illustrated in FIG. 9. This allows promoting the passage of air 170 through the end of the blow reed 111, and therefore facilitating the vibration of the blow reed 111 when the user inhales with his tongue in the previously described configuration. This allows carrying on by inhaling the note of the blow reed 111 and that of the draw reed 121 in a quick, simple and fluid way. This improves the ease of play of hard-to-reach notes and easy-to-reach notes. This allows reducing any latency between the ease of play of those two notes. A concave shape of the bottom 136 of the chamber 131 allows imparting an advantageous direction to the air 170.

Figure 8:
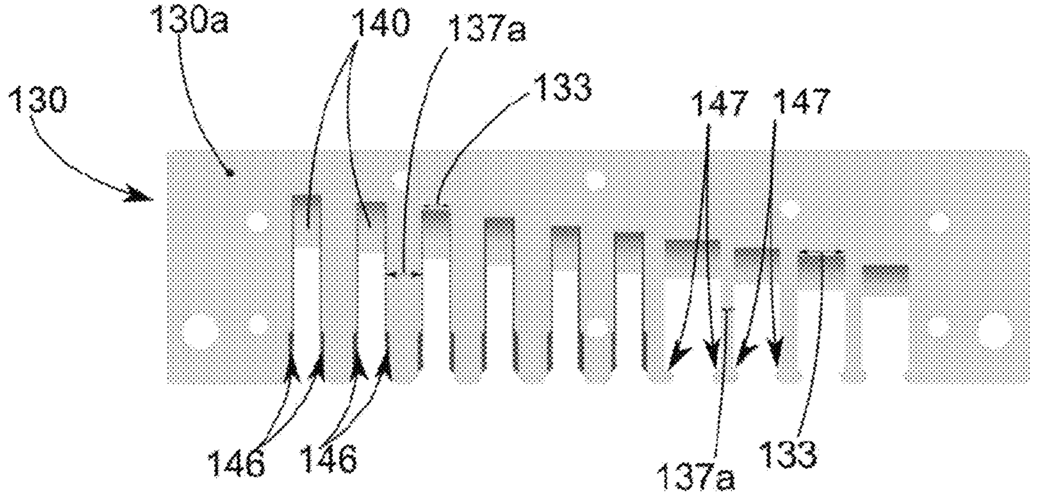
FIG. 8 illustrates a top view of a comb according to another embodiment of the present invention.

It should be noted that the bottom 136 of the chamber 131 may also be flat or square. In particular, FIGS. 5 and 8 and 9 illustrate bottoms 136 of chambers 131 that are flat. According to one embodiment, the bottom 136 may be flat. According to one embodiment, the bottom 136 defines a straight edge with the comb 130.

Figure 17:
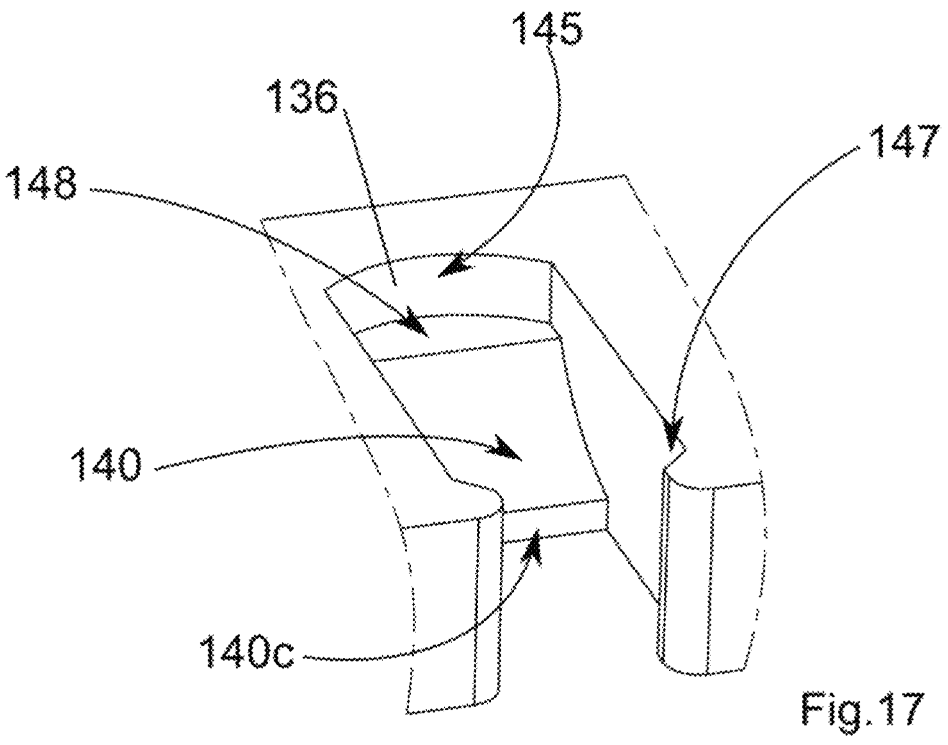

It should be noted, for example according to the embodiment illustrated by FIG. 9, that only some chambers 131 have a rounded bottom 136, as illustrated in FIG. 17 for example, while the other chambers 131 have a flat bottom 136. Similarly in FIG. 9, one could notice that only the chambers 131 having a rounded bottom 136 have a plateau 148 as described above, and as illustrated in FIG. 17 for example. Preferably, and as in FIG. 17, the bottom 136 may have a rounding and a plateau 148. According to one embodiment, the bottom 136 defines a curved edge with the comb 130.

And advantageously, it is these same chambers 131 which have lateral walls 137 whose extension dimension in thickness 137*a* is reduced, thus having an indentation 147 at the opening 135 of these chambers 131, as illustrated by FIG. 17 for example. Conversely, the other chambers 131 have lateral walls 137 whose extension dimension in thickness 137*a* is increased, through the addition of bevels 146, as illustrated in FIG. 16 for example.

According to one embodiment, the present invention proposes a bottom 136 of chamber 131 that is geometrically configured to promote an under-pressure at the free end of the blow reed 111 during the inhale, enabling it to vibrate more easily while the vibration of the draw reed 121 is blocked via the set of pressures.

According to one embodiment, and as illustrated throughout FIGS. 3, 4, 9 and 17, It should be noted that the bottom 136 of the chamber 131 may have a plateau 148, i.e. a step between the bottom 136 of the chamber 131 and the material projection 140.

One way of interpreting this geometric modification of the bottom 136 of the chamber 131 is to consider that, unlike the material projection 140, the bottom 136 of the chamber 131 comprises a material setback. Thus, this material setback forms the plateau 148 and the bottom 136, preferably concave, of the chamber 131. This material setback promotes the passage of air 170 at the end of the blow reed 111, and thus facilitates the vibration of the blow reed 111 when the user inhales with his tongue in the correct configuration.

It should be noted that due to the distribution of the notes on the instrument, it is particularly advantageous in the treble to facilitate the triggering of the blow reed 111 when the user inhales. Yet, these are the notes that require most technique from the user. The reeds being very small in the treble, they are less manageable. On a harmonica of the prior art, the user will manually bring the draw reed 121 closer to the second plate 120 to help block it and trigger the blow reed 111 when he inhales. But in this case, the natural note, i.e. the obtainment of the vibration of the draw reed 121 when the user inhales, is more difficult to play, and especially the sequence between the note obtained with the blow reed 111 and the note obtained with the draw reed 121, when the user inhales is very difficult. In addition, a latency is created when returning to the natural note.

According to one embodiment, the present invention advantageously allows leaving more space at the end of the blow reed 111 so that air escapes more easily through its end that is free to oscillate.

According to a preferred embodiment, the harmonica 100 may comprise chambers 131 of various geometries, such as those discussed before. Thus, the same harmonica 100 may incorporate chambers having different geometries from each other. According to an advantageous embodiment, the same harmonica 100 may comprise:

a. chambers 131 according to the embodiment of FIG. 15, preferably for chambers 131 conventionally numbered 1, 2 and 3, b. chambers 131 according to the embodiment of FIG. 16, preferably for chambers 131 conventionally numbered 4, 5 and 6, c. chambers 131 according to the embodiment of FIG. 17, preferably for chambers 131 conventionally numbered 7, 8, 9 and 10.

According to one embodiment, as illustrated in FIGS. 8 and 9, some chambers 131 have a widthwise extension dimension 133 smaller than that of other chambers 131, or vice versa.

Advantageously, the chambers 131 corresponding to low notes, i.e. to holes 1 to 6, have a widthwise extension dimension 133 smaller than the widthwise extension dimension 133 of the other chambers 131. This allows promoting the formation of an overpressure in the chamber 131 necessary to control the blockage or the vibration of the reeds. Indeed, surprisingly, the narrower the chamber 131, the more easily the draw reed 121 vibrates when the user blows to make the draw reed 121 vibrate. Surprisingly, the air flow is more compact, more compressed, which blocks the blow reed 111 more easily and more quickly and makes the draw reed 121 react more easily and more quickly. Thus, the present invention allows facilitating the vibration of the draw reeds 121 when the user blows. In particular, according to one embodiment, these chambers 131 whose widthwise extension dimension 133 is reduced have thicker lateral walls 137. Preferably, these walls 137 comprise bevels 146 on their surfaces facing the inside of the considered chamber 131 as illustrated in FIGS. 8 and 9. This bevelled shape 146, allows for an accompaniment of the air flow 170 in the chamber 131, in the direction of the upper portion 139 of the chamber 131, preferably in the same way as the ramp formed by the material projection 140. These bevels 146 extend from a proximal portion of the opening 135 towards the bottom 136 of the chamber 131.

Advantageously, the chambers 131 corresponding to high notes, i.e. to holes 7 to 10, have a widthwise extension dimension 133 larger than the widthwise extension dimension 133 of the other chambers 131. This allows promoting the vibration of the blow reed 111 during an inhale by use, thus creating an under-pressure in the chamber 131.

Surprisingly, the wider the chamber 131, the easier it is to achieve high notes by making the blow reeds 111 vibrate as the user inhales. Thus, the present invention has been carried out by advantageously selecting a width 133 of chamber 131 which depends on the difficulty to reach the considered note, while ensuring that this does not interfere with the achievement of the other notes of this same considered chamber 131.

Thus, in a clever and surprising way, and as illustrated through FIG. 9, the chamber 7 for example is much wider than the others, because it is that one in which the vibration, also called the triggering, of the blow reed 121 when inhaling is the most difficult in the absence of the present invention.

The chambers 8, 9 and 10 are preferably less wide than the chamber 7 on the one hand to maximise the space of the chamber 7, and on the other hand because enlarging the width of the chambers 131 amounts to reducing the thickness of the walls 137, which makes the timbre of the notes more acute. Since these are already very high notes from chamber 8, the present invention is advantageous.

In particular, according to an embodiment illustrated in FIGS. 8 and 9, these chambers 131 whose width is increased have thinner lateral walls. These walls comprise flanges 147, also called indentations, at the opening 135 of the considered chamber 131. This allows keeping a surface in contact with the mouth of the user identical to what he is used to so as not to disturb the habits of the user.

Figure 7:
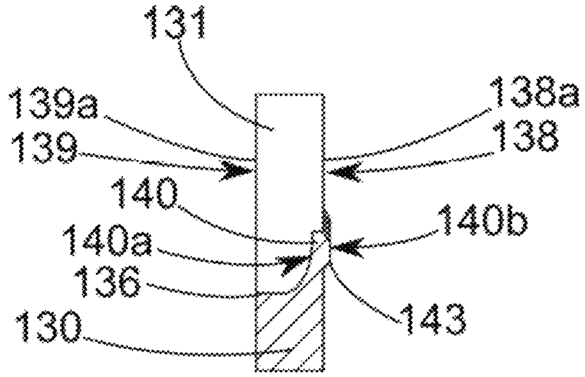
FIG. 7 illustrates a side sectional view of the comb of FIG. 6.

As described in FIGS. 4 and 7 for example, and according to a preferred embodiment, each material projection 140 extends from the bottom 136 of its chamber 131 towards the inlet to its chamber 135.

Each material projection 140 has an extension dimension in thickness, in width 142 and in length 141. Preferably, the widthwise extension dimension 142 of each material projection is equal to the widthwise extension dimension 133 of the considered chamber 131. It should be noted that the extension dimension in thickness of the material projection 140 is smaller than or equal to the extension dimension in thickness 134 of the chamber 131, i.e. of the comb 130.

According to one embodiment, the extension dimension in thickness of some, preferably all, of the material projections 140 decreases from the bottom 136 of its chamber 131 and the inlet 135 of its chamber 131. This then defines a ramp as illustrated in FIGS. 4 and 7.

According to this embodiment, the proximal portion of the material projection 140 with respect to the bottom 136 of the chamber 131 has an extension dimension in thickness larger than the extension dimension in thickness of the distal portion of the material projection 140 with respect to the bottom 136 of the chamber 131, as illustrated in FIGS. 15, 16 and 17 for example. According to an advantageous embodiment, the distal portion of the material projection, also called the end 140*c* of the material projection, is arranged between the bottom 136 of the chamber 131 and the opening 135 of the chamber 131. Advantageously, the end 140*c* of the material projection 140 is remote from the opening 135 and from the bottom 136 of the chamber 131. Preferably, the end 140*c* of the material projection 140 is arranged in the chamber 131 so as to enable the passage of an air flow via the corresponding draw reed 121. According to another embodiment, the extension dimension in thickness of each material projection 140 is constant over its entire lengthwise extension dimension 141.

Advantageously, each material projection 140 has a lengthwise extension dimension 141 extending from the bottom 136 of the chamber 131 towards the opening 135 of the chamber 131. Advantageously, this lengthwise extension dimension 141 is proportional to the lengthwise extension dimension 132 of the chamber 131.

According to one embodiment, the lengthwise extension dimension 141 of a material projection 140 is proportional to the lengthwise extension dimension of the draw reed 121 associated with said considered material projection 140.

As illustrated in FIGS. 4, 7 and 11 to 14, each chamber 131 has an air passage 138*a* for its draw reed 121 and an air passage 139*a* for its blow reed 111. The air passage 139*a* for the blow reed 111 comprises the oscillatory space 112 of the considered blow reed 111. The air passage 138*a* for the draw reed 121 comprises the oscillatory space 122 of the considered draw reed 121. Thus, when the air flow 170 circulates in the harmonica 100, it can pass through the air passages 139*a* and/or 138*a* of the blow 111 and/or draw 121 reeds to make them vibrate.

Advantageously, the air passage 139*a* for the blow reed 111 has lengthwise and widthwise extension dimensions respectively larger than the lengthwise and widthwise extension dimensions of the considered blow reed 111.

Advantageously, the air passage 138*a* for the draw reed 121 has lengthwise and widthwise extension dimensions of extension respectively larger than the lengthwise and widthwise extension dimensions of the considered draw reed 121.

Preferably, the material projection 140 comprises a portion extending parallel to the air passage 138*a* for the draw reed 121, advantageously, the material projection 140 at least partially obstructs the air passage 138*a* for the considered draw reed 121.

In a particularly clever manner and as illustrated throughout FIGS. 11 to 14, each material projection is configured to lie opposite, preferably directly opposite, the draw reed 121 corresponding to its chamber 131. Preferably, the material projection 140 is configured to be directly opposite at least one portion of the draw reed 121, i.e. there is no solid material between the material projection 140 and the considered draw reed 121. In this configuration, this enables the material projection 140 to reduce the oscillatory space 122 of the draw reed 121 by generating a set of pressures inside the chamber 131, advantageously when the user inhales from the chamber 131 of said draw reed 121, preferably by positioning his tongue so as to make the blow reed 111 oscillate.

Indeed, the principle as presented before is that, under some conditions, the inhale produces a note different from that one associated with the draw reed 121. For this purpose, it is not the draw reed 121 that should vibrate, but the blow reed 111, the only possible alternative for air circulation. Indeed, by positioning one's tongue in order to minimise the space available for air to pass between it and the palate, whether by moving the back of the tongue towards the throat, or by advancing the middle portion of the tongue towards the teeth, the user can make the blow reed 111 vibrate when inhaling by means of the present invention. To help him reach this note not present in the instrument, the present invention limits the oscillation of the draw reed 121 in this configuration, which therefore enables the user to make the blow reed 111 oscillate more easily when inhaling. Indeed, the drawn air then passes through the blow reed 111, making it vibrate since the draw reed 121 is blocked by the set of pressures created in the chamber 131 and explained before. This material projection 140, as illustrated before, is advantageously arranged between a portion of the draw reed 121 and the inside of the chamber 131.

Thus, it is the presence and the configuration of these material projections 140 that enables, at least in part, the production of musical notes not provided for by the instrument and easy to access, i.e. easy to produce via the present invention.

Figure 6:
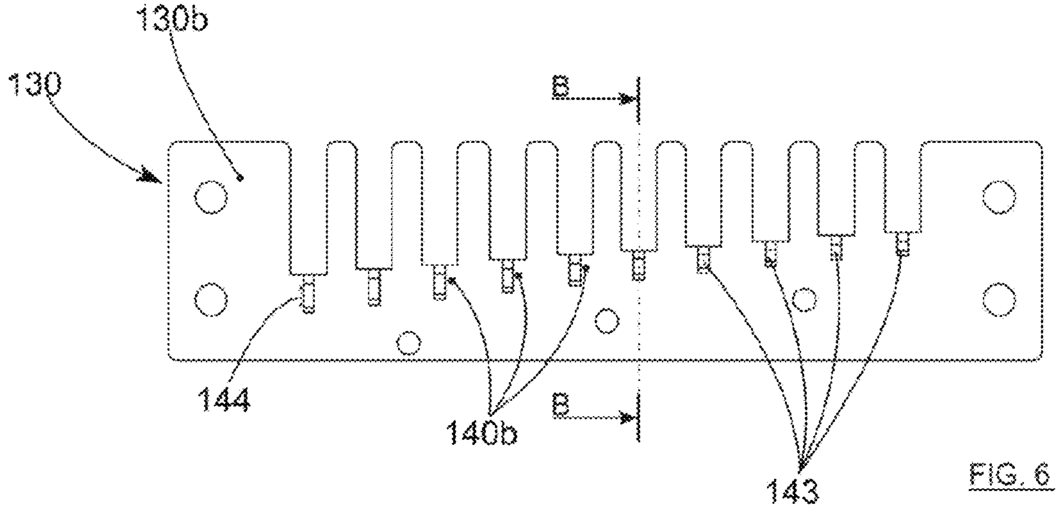
FIG. 6 illustrates a bottom view of the comb of FIG. 5.

According to an embodiment illustrated in FIGS. 5 and 6, each material projection has an internal face 140*a* facing the inside of a chamber 131, and an external face 140*b* facing the outside of a chamber 131, opposite, preferably directly opposite, the draw reed 121. Preferably, each external face 140*b* of some or all of the material projections 140 may comprise a protuberance 143. This protuberance 143 has dimensions proportional to the extension dimensions of the material projection 140 to which it corresponds, i.e. on which it is arranged. Each of these protuberances 143 is configured to improve tightness of the chamber 131 to which the material projection 140 corresponds. In particular, the lengthwise extension dimension 144 of a protuberance 143 is advantageously proportional to the lengthwise extension dimension 141 of the material projection 140 supporting it.

In particular, in FIG. 6 which illustrates the lower face 130*b* of the comb 130, one could notice the presence of the protuberances 143 and the variation of their lengthwise extension dimension 144 according to the lengthwise extension dimension 132 of the chambers 131.

In particular, one could notice in FIG. 7 the positioning of the protuberances 143 with respect to the ramp formed by the material projection 140 according to an embodiment of the present invention.

Indeed, although located outside the chamber 131, and as illustrated throughout FIGS. 11 to 14, each protuberance protrudes up to the level of the base of the draw reed 111 corresponding to the considered chamber 131.

As illustrated in FIGS. 7 and 11 to 14, the protuberance 143 of a material projection 140 extends at least partially into the air passage 138*a* for the considered draw reed 121. This allows improving the tightness of said air passage 138*a* and obstructing it even more effectively.

Each reed, whether a blow 111 or draw 121 one, has a longitudinal body comprising a head and a base corresponding to a portion secured to the corresponding support plate 110 or 120. It is the head that corresponds to the oscillating end of the reed. A reed may be considered as a vibrating beam, one end of, called the base, is fixedly mounted on a plate and the other end, called the head, is free to oscillate in an oscillatory space.

These protuberances 143 are configured and positioned to lie opposite, preferably directly opposite, the base of the draw reeds 121 so as to improve the confinement of the air 170 in the chamber 131 and thus reduce any leakage. Surprisingly, one could notice that the quality and control of the circulation of air 170 in a harmonica, in particular in a chamber 131, depends on the geometric configuration of the chamber 131 and the quality of the insulation so to favour some paths over others, for the air 170 whether it is blown or inhaled.

When the user inhales to make the blow reed 111 vibrate, these protuberances 143 allow limiting the passage of air 170 through the base of the inhaled reed 121 even more, and therefore improving the confinement of air 170 and thus compacting the air flow 170 more effectively.

When the user inhales to make the blow reed 111 vibrate, these protuberances 141 allow reducing the oscillatory space 122 of the draw reed 121, and therefore help blocking it, and triggering the blow reed 111.

In a particularly advantageous manner, these protuberances 141 also allow limiting the spin effect, and possibly suppressing it. The spin effect is an oscillatory phenomenon occurring in the reeds. For example, when the user inhales to trigger a blow reed 111, it quite often happens with harmonicas of the prior art that the inhaled reed 121 start twisting, i.e. vibrating not in its lengthwise extension dimension, but in its widthwise extension dimension, which produces a high-pitched note that adds to the note produced by the blow reed 111. This spin effect is due to the air 170 escaping through the sides of the base of the draw reed 121.

It should also be noted that according to one embodiment, the comb 130 may be flexible, i.e. comprise a material having a hardness coefficient according to an axis normal to the upper face of the comb comprised between 15A and 100A according to the Shore A scale.

This flexibility of the comb 130 allows increasing the air confinement effect, when joining the various elements of the harmonica 100, for example via screws. The flexibility of the comb 130 allows improving the confinement of air in the chambers 131 even more by acting as a locally deformed seal for example.

Indeed, the use of a so-called flexible comb 130 enables a local deformation of the latter so as to partially conform to at least one portion of the periphery of the reeds.

Preferably, the comb 130 has a greater flexibility than the flexibility of the first plate 110 and the second plate 120.

Advantageously, the comb 130 has a hardness coefficient according to an axis normal to its upper face 130*a* lower than the hardness coefficients according to axes normal to the main surfaces of the first 110 and second 120 plates.

Cleverly, the flexible nature of the comb 130 according to the present invention limits, and even prevents, air leaks between the comb 130 and the first 110 and second 120 plates. These being quite often not flat, the flexibility of the comb 130 significantly contributes to the tightness of the instrument, and therefore to the management of a more compact air flow 170 in the chamber 131.

Figure 10:
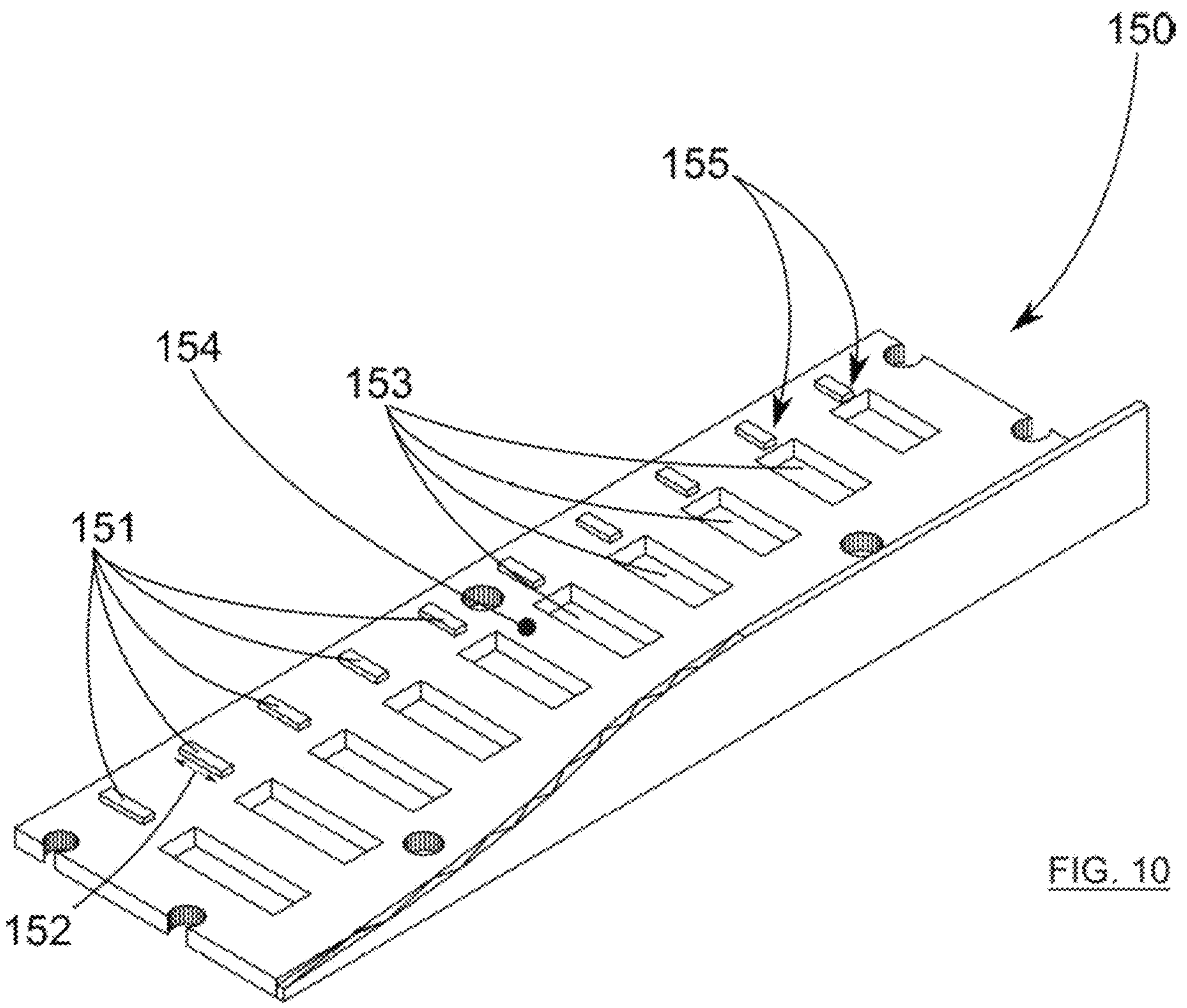
FIG. 10 illustrates a perspective view of an additional plate according to an embodiment of the present invention.

According to one embodiment, the harmonica 100 further comprises an additional plate 150. FIG. 10 illustrates an embodiment of this additional plate 150. This additional plate 150 is intended to be arranged above the first plate 110. This additional plate 150 comprises a plurality of additional material projections 155, and preferably apertures 153 intended to enable the passage of air 170, and preferably the oscillation of the blow reeds 111. According to a preferred embodiment, described later on, this additional plate 150 also comprises a plurality of lugs 151.

Advantageously, each additional material projection 155 allows minimising air passing through the base and along a blow reed 111 portion when the user inhales to trigger the blow reed 111. Preferably, each additional material projection 155 helps compact and direct air more directly towards the end of the blow reed 111, which triggers even more easily.

Advantageously, each additional material projection 155 allows minimising air passing through the base and along a portion of the blow reed 111 when the user blows to trigger the draw reed 121. Preferably, each additional material projection 155 helps compact and direct air more directly towards the end of the draw reed 121, which triggers even more easily.

These additional material projections 155 may have a variable lengthwise extension dimension depending on the desired effect. This dimension is advantageously proportional to the lengthwise extension dimension of the considered blow reed 111. The obstructions thus created opposite the base of the blow reed 111 enable air to be compressed at this point. This favours setting of the end of the blow reed 111 in vibration without hindering the length of the blow reed 111 set in vibration, thus avoiding modifying its timbre.

Cleverly, the apertures 153 also have a variable lengthwise extension dimension depending on the desired effect. This dimension is herein again advantageously proportional to the lengthwise extension dimension of the considered blow reed 111.

FIG. 10 illustrates the inner surface 154 of the additional plate 150. This inner surface 154 is intended to be opposite and preferably in contact with the upper face of the first plate 110 so that the additional material projections 155 are opposite the blow reeds 111.

In a particularly clever manner, this additional plate 150 allows limiting air leaks at the base of the blow reeds 111 and preferably over a portion of their lengthwise extension dimension.

Preferably, each additional material projection 155 comprises a portion extending parallel to the air passage 139*a* of the blow reed 111, advantageously, each additional material projection 155 at least partially obstructs the air passage 139*a* of the considered blow reed 111.

It should be noted, in particular throughout FIGS. 11 to 14, that each additional material projection 155 comprises an internal face 155*a* and an external face 155*b*. The internal face 155*a* of each additional material projection 155 is intended to be opposite at least one portion of a blow reed 111. Preferably, the internal face 155*a* of each additional material projection 155 is carried by the inner surface 154 of the additional plate 150. The external face 155*b* of each additional material projection 155 is intended to be opposite at least one portion of the cover 160.

In a particularly advantageous manner, these additional material projections 155 fill a similar function for the blow reeds 111 as the role filled by the material projections 140 for the draw reeds 121.

According to one embodiment, as illustrated in FIG. 14 for example, the distal portion of the additional material projection 155, also called end 155*c* of the additional material projection 155, is arranged between the opening 135 of the chamber 131 and the bottom 136 of chamber 131. Advantageously, the end 155*c* of the additional material projection 155 is remote from the bottom 136 and from the opening 135 of the chamber 131. Preferably, the end 155*c* of the additional material projection 155 is arranged in the chamber 131 so as to enable the passage of an air flow via the corresponding blow reed 111.

According to an advantageous embodiment described in FIG. 10 for example, each additional material projection 155 may comprise on its inner face 155*a* at least one lug 151. Thus, according to this embodiment, the additional plate 150 comprises a plurality of lugs 151.

Preferably, each lug 151 is configured to lie opposite a portion of a blow reed 111. Thus, cleverly and according to one embodiment, each lug 151 allows minimising air passing through the base and along a blow reed 111 portion when the user inhales to trigger the blow reed 111. Preferably, each lug 151 helps compact and direct air more directly towards the end of the blow reed 111, which triggers even more easily.

Preferably, each lug 151 is configured to lie opposite a portion of a blow reed 111. Thus, cleverly and according to one embodiment, each lug 151 allows minimising air passing through the base and along a blow reed 111 portion when the user blows to trigger the draw reed 121. Preferably, each lug 151 helps compact air and to redirect air more quickly towards the end of the draw reed 121, which triggers even more easily.

In a particularly advantageous manner, the lugs 151 also allow limiting the spin effect, and possibly suppressing it, like the protuberances for the draw reeds. Indeed, when the user blows to trigger a draw reed 121, it quite often happens with harmonicas of the prior art that the blow reed 111 starts twisting, i.e. vibrating not in its lengthwise extension dimension, but in its widthwise extension dimension, which herein again produces a high-pitched note which adds to the note produced by the draw reed 121. This spin effect is also due to the air 170 escaping through the sides of the base of the blow reed 111, very close to the opening 135 of the chamber 131.

Advantageously, each lug 151 is configured to reduce the oscillatory space 112 of a blow reed 111 when the user blows into the chamber 131 of said blow reed 111 to make the draw reed 121 vibrate. And that being so preferably when the user positions his tongue so as to make the draw reed 121 oscillate, i.e. when the user positions his tongue so as to minimise the space available for the air to pass between it and the palate, either by moving the back of the tongue towards the throat, or by advancing the middle portion of the tongue towards the teeth.

In a particularly advantageous manner, these lugs 151 fill a similar role for the blow reeds 111 as the role filled by the protuberances 143, for the draw reeds 121.

In addition, the additional material projections 155 and the lugs 151 fill a similar role for the blow reeds 111 as the role filled by the material projections 140 and the protuberances 143 for the draw reeds 121.

Indeed, each lug 151 is configured to lie opposite, preferably directly opposite, the blow reed 111 corresponding to its chamber 131. Preferably, each lug 151 is configured to be directly opposite at least one portion of the blow reed 111, i.e. there is no solid material between the lug 151 and the considered blow reed 111.

In this configuration, this enables the lug 151 to reduce the oscillatory space 112 of the blow reed 111 by generating a set of pressures inside the chamber 131, advantageously when the user blows from the chamber 131 of said blow reed 111, preferably by positioning his tongue so as to make the draw reed 121 oscillate.

Preferably, each lug 151 extends from the inlet 135 of each chamber 131 towards the bottom 136 of each chamber 131 according to a lengthwise extension dimension 152 as illustrated in FIG. 10.

According to one embodiment, this lengthwise extension dimension 152 is proportional to the lengthwise extension dimension 132 of the considered chamber 131, and therefore of the considered blow reed 111.

According to another embodiment, this lengthwise extension dimension 152 depends on the desired effect, i.e. on the phenomenon that one wishes to promote.

Indeed, according to one embodiment, the lengthwise extension dimensions 152 of the lugs 151 are configured to meet the needs of the user. For example, the additional material projection 155 and/or the lug 151 of the chamber 7 could be lengthened or thickened in order to facilitate even more the triggering of the blow reed 111 while inhaling.

As illustrated in FIGS. 4, 7 and 11 to 14, each lug 151 extends at least partially into the air passage 139*a* for a blow reed 111. This allows increasing the tightness of said air passage 139*a*, and therefore of the chamber 131.

As indicated before, the present invention advantageously takes advantage of a set of pressures established in the chamber 131 and allowing blocking the vibration of a reed while enabling the vibration of the complementary reed.

This set of pressures is based on the formation of an overpressure in the chamber 131 at the blow reed 111 when the user blows in a configuration intended to make the draw reed 121 vibrate. In this configuration, the blow creates an overpressure in the chamber 131. In particular, according to one embodiment, the overpressure at the blow reed 111 blocks it, while the overpressure at the draw reed 121 will make it vibrate. Indeed, the air circuit 170 in the chamber 131 in this configuration encounters less resistance passing via the draw reed 121 than via the blow reed 111. Henceforth, the breath makes the draw reed 121 vibrate.

Thus, in a particularly advantageous manner, the additional plate 150 allows limiting air leaks at the base of the blow reed 111, and therefore compacting the air flow 170 in the chamber 131 when the user blows to trigger the draw reed 121.

The additional plate 150 also allows limiting, and possibly suppressing, the spin effect.

Preferably, the additional plate 150 allows, when the user blows to trigger the draw reed 121, reducing the oscillatory space 112 of the blow reed 111 and therefore helps blocking it and triggering the draw reed 121.

Figure 13:
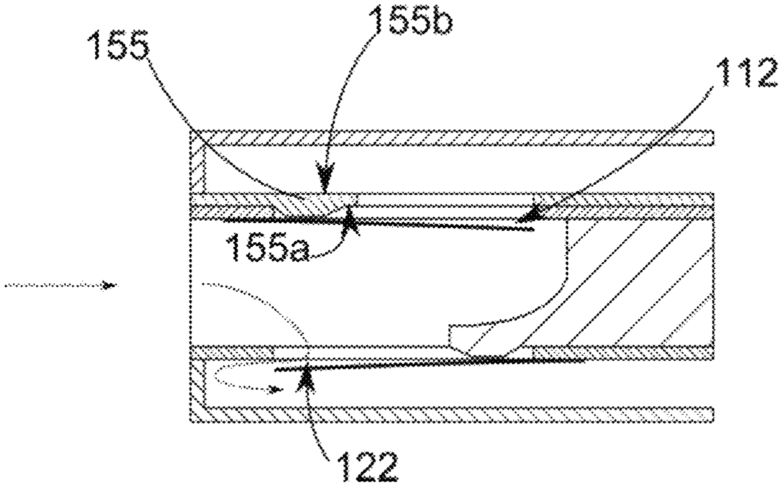
FIG. 13 illustrates a schematic sectional side view of a harmonica according to an embodiment of the present invention when the user blows and wishes to make the draw reed vibrate.

This situation is illustrated for example in FIG. 13. In FIG. 13, the air flow circulates via the draw reed 121 while the user blows from the chamber 131, thereby enabling the draw reed 121 to vibrate while blocking the blow reed 111 by said set of pressures. Conversely, the case of a normal blow is illustrated in FIG. 11, the user blows air from the chamber 131 and thus makes the blow reed 111 vibrate, that being so when he does not place his tongue in particular way.

Thus, cleverly, the modifications made to the comb 130 and the addition of this additional plate 150 enable a user to more easily reach some notes that are usually difficult to reach, which notes generally require many hours of training, but which are more directly accessible in this instance. These modifications and this addition also allow for a better control of these notes in a playing situation.

The present invention facilitates the triggering, i.e. the setting in vibration, of the "opposite reed", the blow reed when inhaling, or the draw reed when blowing.

Figure 11:
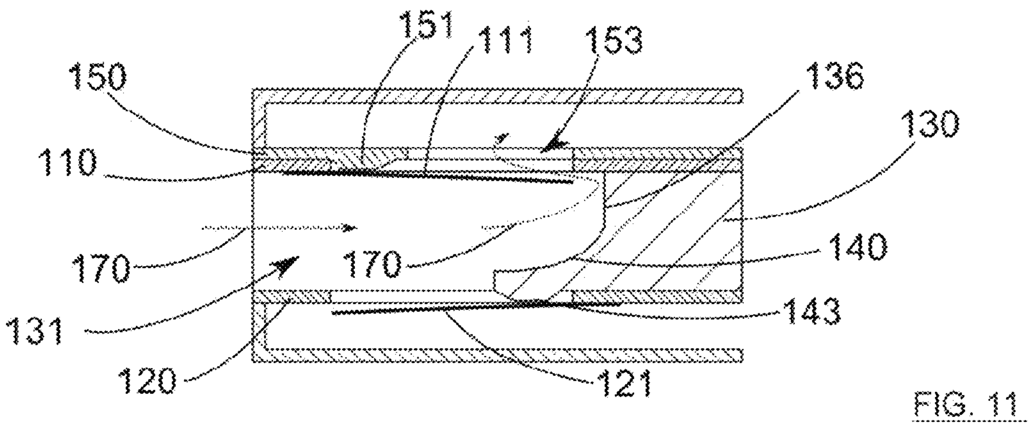
FIG. 11 illustrates a schematic side sectional view of a harmonica according to an embodiment of the present invention when the user blows and wishes to make the blow reed vibrate.

FIGS. 11 through 14 illustrate the normal triggering situations and the opposite triggering situations. FIG. 11 illustrates the case where the user blows into the chamber making the blow reed vibrate. FIG. 12 illustrates the case where the user inhales from the chamber making the inhaled reed vibrate.

FIG. 13 illustrates the situation opposite to that of FIG. 11. FIG. 13 illustrates the case where the user blows into the chamber so as to make the draw reed vibrate.

FIG. 14 illustrates the situation opposite to that of FIG. 12. FIG. 14 illustrates the case where the user inhales from the chamber so as to make the blow reed vibrate.

In the case of the opposite draw reed, therefore when the user blows, less air escapes at the base of the blow reed, and preferably along a portion of its lengthwise extension dimension, advantageously in the range of 50% thereof. Thus, the air is more compacted in the chamber, this allows creating an overpressure which blocks the blow reed even more quickly, and enables the air flow to move even more quickly towards the end of the draw reed so as to leave the chamber while triggering the draw reed.

In the case of the opposite blow reed, therefore when the user inhales, the air is more compacted towards the vibrating end of the blow reed since it is less able to escape from the base of this same reed, and suddenly this creates an under-pressure in the chamber. This under-pressure blocks the draw reed and enables the release of the blow reed.

The present invention facilitates handling of a harmonica and enables experienced players to manipulate notes that are not present on the instrument and that being so in a simple, easy and repeatable manner. Indeed, the question of repeatability is essential. In this instance, the present invention reduces the number of parameters determining whether these particular notes are obtained or not.

Cleverly, the cooperation between the additional plate with the first plate is similar to the cooperation of the comb according to the present invention with the second plate. It is the implementation of the same inventive concept applied symmetrically to two elements of the harmonica that allows achieving this ease of play and this repeatability. In particular, this repeatability is related to the improvement of the partitioning of the chambers, i.e. the improvement of the control of the circulation of air in the chambers.

Thus, the present invention makes it easier to obtain some musical notes, for example as of the purchase of the instrument, and advantageously without requiring a long and difficult learning process for the user.

In a particularly clever manner, each element of the present invention brings in something independently of the others, and combined together they maximise the ease of play of the harmonica according to the present invention. Cleverly, each element of the present invention improves tightness inside the chamber and compacts the air flow a little more, therefore the pressure sets are sharper, and therefore the reeds more reactive.

It should be noted that advantageously, the comb and the additional plate according to the present invention have technical advantages independently of each other, and combined together they maximise the ease of play of the harmonica according to the present invention. Cleverly, the comb and the additional plate act in synergy with each other to improve tightness inside the chamber and compact the air flow a little more, therefore the pressure sets are sharper, and therefore the reeds more reactive.

Thus, the harmonica according to the present invention could either comprise one amongst the comb and the additional plate, or comprise the comb and the additional plate.

The invention is not limited to the previously-described embodiments and extends to all of the embodiments covered by the claims.

LIST OF THE REFERENCES

10 Harmonica of the prior art
11 Comb of the prior art
100 Harmonica
110 First plate
111 Blow reed
112 Oscillatory space of a blow reed
120 Second plate
121 Draw reed
122 Oscillatory space of a draw reed
130 Comb
130*a* Upper face of the comb
130*b* Lower face of the comb
131 Chamber
132 Lengthwise extension dimension
133 Widthwise extension dimension
134 Heightwise extension dimension
135 Opening
136 Bottom
137 Lateral wall
137*a* Widthwise extension dimension of a lateral wall
138 Lower portion
138*a* Air passage for the draw reed
139 Upper portion
139*a* Air passage for the blow reed
140 Material projection
140*a* Internal face of the material projection
140*b* External face of the material projection
140*c* End of the material projection
141 Lengthwise extension dimension of the material projection
142 Widthwise extension dimension of the material projection
143 Protuberance
144 Lengthwise extension dimension of a protuberance
145 Fillet
146 Bevel
147 Indentation
148 Plateau
150 Additional plate
151 Lug
152 Lengthwise extension dimension of the lug
153 Aperture
154 Inner surface of the additional plate
155 Additional material projection
155*a* Internal face of the additional material projection
155*b* External face of the additional material projection
155*c* End of the additional material projection
160 Cover
170 Air flow

The invention claimed is:

1. A diatonic harmonica comprising at least:

a. a comb comprising a plurality of chambers each comprising an opening configured to let a user's breath pass, each chamber defining an oscillatory space for a blow reed and an oscillatory space for a draw reed, the blow reed and the draw reed of each chamber defining a pair of complementary reeds;

b. a first plate comprising a plurality of blow reeds, the first plate being arranged opposite a f irst face of the comb, each blow reed of the plurality of blow reeds being configured to oscillate in its oscillatory space when the user blows at least into the chamber defining said oscillatory space;

c. a second plate comprising a plurality of draw reeds, the second plate being arranged opposite a second face of the comb, each draw reed of the plurality of draw reeds being configured to oscillate in its oscillatory space when the user inhales at least from the chamber defining said oscillatory space;

the harmonica wherein at least part of the chambers of the plurality of chambers has a widthwise extension dimension larger than the widthwise extension dimension of at least another part of the chambers of the plurality of chambers.

2. The harmonica according to claim 1, wherein each chamber of the plurality of chambers has a bottom opposite to the opening and configured to stop the user's breath, two lateral walls configured to separate one chamber from the other contiguous chambers, an upper portion of the chamber being defined at least partially by at least one portion of a blow reed and a lower portion of the chamber being defined at least partially by at least one portion of the draw reed complementary to said blow reed.

3. The harmonica according to claim 1, wherein at least part of the chambers of the plurality of chambers has a rounded bottom.

4. The harmonica according to claim 1, wherein:

a. at least part of the chambers of the plurality of chambers comprises at least one material projection, each material projection being arranged at least partially opposite a portion of a draw reed and being configured to enable an oscillation of the blow reed of the complementary pair of said draw reed when the user inhales from the chamber of said draw reed; and/or b. it comprises at least one additional plate arranged opposite a face of the first plate, and comprising at least one plurality of additional material projections, each additional material projection being arranged at least partially opposite a portion of a blow reed and being configured to enable the oscillation of the draw reed of the complementary pair of said blow reed when the user blows into the chamber of said blow reed.

5. The harmonica according to claim 1, wherein at least part of the chambers of the plurality of chambers comprises lateral walls having a widthwise extension dimension larger than the widthwise extension dimension of the lateral walls of at least another part of the chambers of the plurality of chambers.

6. The harmonica according to the preceding claim 5, wherein at least one lateral wall of part of the chambers of the plurality of chambers comprises an additional surface, this additional surface comprising a bevel.

7. The harmonica according to claim 4, wherein each material projection extends from the bottom of its chamber towards the opening of its chamber.

8. The harmonica according to claim 7, wherein each material projection comprises an extension dimension in thickness, this extension dimension in thickness decreasing from the bottom of its chamber towards the opening of its chamber, preferably defining a ramp.

9. The harmonica according to claim 4, wherein at least part of the material projections define a plateau with the bottom of their chamber, this plateau extending according to a plane orthogonal to a plane of extension of the lateral walls of their chamber.

10. The harmonica according to claim 1, wherein the lower portion of each chamber of the plurality of chambers comprises an air passage for a draw reed, and wherein each material projection extends at least partially so as to obstruct at least partially the air passage of a draw reed.

11. The harmonica according to claim 4, wherein each chamber of the plurality of chambers comprises a widthwise extension dimension and a lengthwise extension dimension, and wherein each additional material projection has a widthwise extension dimension equal to the widthwise extension dimension of their chamber, and a lengthwise extension dimension smaller than the lengthwise extension dimension of their chamber.

12. The harmonica according to the preceding claim 11, wherein a ratio between the lengthwise extension dimension of an additional material projection and the lengthwise extension dimension of its chamber is comprised between 0.1 and 0.9, preferably between 0.3 and 0.7 and advantageously equal to 0.5.

13. The harmonica according to claim 4, wherein each additional material projection has an internal face facing an inside of its chamber and an external face facing an outside of its chamber, and wherein each additional material projection comprises at least one lug arranged on its internal face.

14. The harmonica according to claim 1, wherein each additional material projection is configured to come opposite, the blow reed corresponding to its chamber.

15. The harmonica according to claim 4, wherein each chamber of the plurality of chambers comprises a widthwise extension dimension and a lengthwise extension dimension, and wherein each material projection has a widthwise extension dimension equal to the widthwise extension dimension of their chamber, and a lengthwise extension dimension smaller than the lengthwise extension dimension of their chamber.

16. The harmonica according to the preceding claim 15, wherein a ratio between the lengthwise extension dimension of a material projection and the lengthwise extension dimension of its chamber is comprised between 0.1 and 0.9, preferably between 0.2 and 0.5 and advantageously equal to 0.33.

17. The harmonica according to claim 1, wherein the comb has a flexibility greater than a flexibility of the first plate and a flexibility of the second plate.

18. A comb for a diatonic harmonica, comprising a first plate comprising a plurality of blow reeds and a second plate comprising a plurality of draw reeds, said comb comprising a plurality of chambers, each chamber of the plurality of chambers being associated to a complementary pair of reeds comprising a blow reed and a draw reed, each chamber of the plurality of chambers each comprising an opening configured to enable the user's breath to pass and each intended to define an oscillatory space for a blow reed and for a draw reed, said comb wherein at least part of the chambers of the plurality of chambers has a widthwise extension dimension larger than the widthwise extension dimension of at least another part of the chambers of the plurality of chambers.

19. A kit for a diatonic harmonica, comprising at least one comb according to claim 18 and at least one additional plate for a diatonic harmonica comprising a first plate comprising a plurality of blow reeds and a second plate comprising a plurality of draw reeds, each blow reed forming a complementary pair of reeds with a draw reed, said additional plate being intended to be arranged above the first plate, and at least part of the chambers of the plurality of chambers has a widthwise extension dimension larger than the widthwise extension dimension of at least another part of the chambers of the plurality of chambers.

* * * * *